United States Patent
Geary et al.

(10) Patent No.: US 9,961,211 B1
(45) Date of Patent: May 1, 2018

(54) SYSTEM AND METHOD FOR TRACKING CALL BILLING

(71) Applicant: Avaya Inc., Basking Ridge, NJ (US)

(72) Inventors: Dara Geary, Galway (IE); Shane Kelly, Galway (IE); Eoghan O'Hare, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 0 days. days.

(21) Appl. No.: 15/299,831

(22) Filed: Oct. 21, 2016

(51) Int. Cl.
*H04M 15/00* (2006.01)
*H04M 3/00* (2006.01)
*H04M 3/51* (2006.01)
*H04L 29/06* (2006.01)

(52) U.S. Cl.
CPC ........ *H04M 15/39* (2013.01); *H04L 65/1006* (2013.01); *H04M 3/5166* (2013.01); *H04M 3/5175* (2013.01); *H04M 2207/08* (2013.01)

(58) Field of Classification Search
CPC .. H04M 15/00; H04M 15/12; H04M 15/8083; H04M 3/51; H04M 3/5166; H04M 3/523; H04M 3/42059; H04M 3/42068; H04M 2201/40; H04M 2203/2011; H04M 2215/0184; H04M 2215/14
USPC ............... 379/32.01, 114.01, 114.03, 114.21, 379/114.22, 114.28, 265.01, 265.02, 379/266.01, 309
See application file for complete search history.

(56) References Cited

U.S. PATENT DOCUMENTS

| | | | | |
|---|---|---|---|---|
| 5,425,087 A * | 6/1995 | Gerber | ..................... | H04M 3/36 379/112.01 |
| 5,710,807 A * | 1/1998 | Smith | ................... | H04M 15/00 379/114.01 |
| 5,960,070 A * | 9/1999 | O'Donovan | .......... | H04M 15/00 379/114.01 |
| 6,324,528 B1 * | 11/2001 | Hillson | ................ | G06Q 20/127 377/16 |
| 7,366,494 B1 * | 4/2008 | Ham | ....................... | H04M 3/00 455/405 |
| 8,224,922 B1 * | 7/2012 | Hession | .............. | H04M 3/4938 709/202 |
| 2006/0182234 A1 * | 8/2006 | Scherer | ................ | H04M 3/436 379/67.1 |
| 2007/0201367 A1 * | 8/2007 | Chen | ....................... | H04L 12/66 370/235 |

(Continued)

OTHER PUBLICATIONS

G. Camarillo and H. Schulzine; RFC3960: Early Media and Ringing Tone Generation in the Session Initiation Protocol (SIP); Dec. 2004; Columbia University; New York.

(Continued)

*Primary Examiner* — Binh Kien Tieu
(74) *Attorney, Agent, or Firm* — Stevens & Showalter, LLP

(57) ABSTRACT

Tracking a status of an ongoing call includes monitoring, by a computer of a contact center, the ongoing call that is connected with a human agent and that originated from a provider network and determining when an automated agent instead of the human agent is connected with the ongoing call. The computer of the contact center can then send a first message to the provider network, wherein the first message comprises first data indicative that the automated agent instead of the human agent is connected with the ongoing call.

20 Claims, 11 Drawing Sheets

(56) References Cited

U.S. PATENT DOCUMENTS

2016/0149768 A1* 5/2016 Hooshiari .............. G06Q 10/00
709/224

OTHER PUBLICATIONS

A. Niemi & Ed. Nokia; "Session Initiation Protocol (SIP) Extension for Event State Publication"; Oct. 2004; Network Reporting Group; Request for Comment No. 3903.

* cited by examiner

SYSTEM AND METHOD FOR TRACKING CALL BILLING

BACKGROUND

Embodiments of the present disclosure generally relate to tracking whether or not a call is connected to a human agent, and, in particular, to generating billing-related messages based on that tracking.

Some jurisdictions have introduced, or are contemplating, legislation, rules, or regulations whereby a customer dialing a contact center cannot be billed for that call for any time in which the caller is not connected with a human agent of the contact center. Thus, any time spent with an automated agent, with a text-based chat bot, automated voice bot, with an Interactive Voice Response (IVR) menu or with some other wait treatment is not billable to the caller by the provider network. Additionally, transfers from one agent to another service that result in a wait period also implicate such rules and the wait period is not billable to the caller as well.

BRIEF SUMMARY

Aspects of the present disclosure relate to a method for tracking a status of an ongoing call that includes monitoring, by a computer of a contact center, the ongoing call that is connected with a human agent and that originated from a provider network and determining when an automated agent instead of the human agent is connected with the ongoing call. The computer of the contact center can then send a first message to the provider network, wherein the first message comprises first data indicative that the automated agent instead of the human agent is connected with the ongoing call.

In accordance with that aspect, the computer of the contact center can detect when the ongoing call is transferred from the human agent of the contact center to the automated agent. The ongoing call can, for example, be a session initiation protocol (SIP) based call and the automated agent, for example, can be an interactive voice response (IVR) system. Further, the provider network can, for example, be an ISDN network, wherein the computer of the contact center communicates with an ISDN gateway connected to the provider network and sending the first message comprises sending, by the computer of the contact center, a SIP-based message to the ISDN gateway.

Another aspect of the present disclosure relates to determining, by the computer of the contact center, when the ongoing call connected to the human agent is placed on hold; and then sending a second message to the provider network, wherein the second message comprises data indicative of the ongoing call being placed on hold. Further, the computer of the contact center can determine when the human agent takes the ongoing call off hold, and in response to the ongoing call being taken off hold, can send a third message to the provider network, wherein the third message comprises data indicative that the human agent is connected to the ongoing call.

A further aspect of the present disclosure relates to the computer of the contact center reconnecting the human agent to the ongoing call; and sending a message to the provider network, wherein the message comprises data indicative that the human agent is reconnected to the ongoing call. The message can also include data indicative of a billing rate associated with the human agent.

Additional aspects of the present disclosure relate to a system for tracking a status of an ongoing call that includes a memory device storing executable instructions and a processor in communication with the memory device that can execute the executable instructions. In particular, executing the executable instructions by the processor causes the processor to a) monitor the ongoing call that is connected with a human agent and that originated from a provider network; b) determine when an automated agent instead of the human agent is connected with the ongoing call; and c) send a first message to the provider network, wherein the first message comprises first data indicative that the automated agent instead of the human agent is connected with the ongoing call.

In accordance with that aspect, the processor can detect when the ongoing call is transferred from the human agent of the contact center to the automated agent. The ongoing call can, for example, be a session initiation protocol (SIP) based call and the automated agent, for example, can be an interactive voice response (IVR) system. Further, the provider network can, for example, be an ISDN network, wherein the processor communicates with an ISDN gateway connected to the provider network and sending the first message comprises sending, by processor, a SIP-based message to the ISDN gateway.

Another aspect of the present disclosure relates to determining, by the processor, when the ongoing call connected to the human agent is placed on hold; and then sending a second message to the provider network, wherein the second message comprises data indicative of the ongoing call being placed on hold. Further, the processor can determine when the human agent takes the ongoing call off hold, and in response to the ongoing call being taken off hold, can send a third message to the provider network, wherein the third message comprises data indicative that the human agent is connected to the ongoing call.

A further aspect of the present disclosure relates to processor reconnecting the human agent to the ongoing call; and sending a message to the provider network, wherein the message comprises data indicative that the human agent is reconnected to the ongoing call. The message can also include data indicative of a billing rate associated with the human agent.

BRIEF DESCRIPTION OF THE DRAWINGS

So the manner in which the above recited features of the present disclosure may be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein.

DETAILED DESCRIPTION

Figure 1:
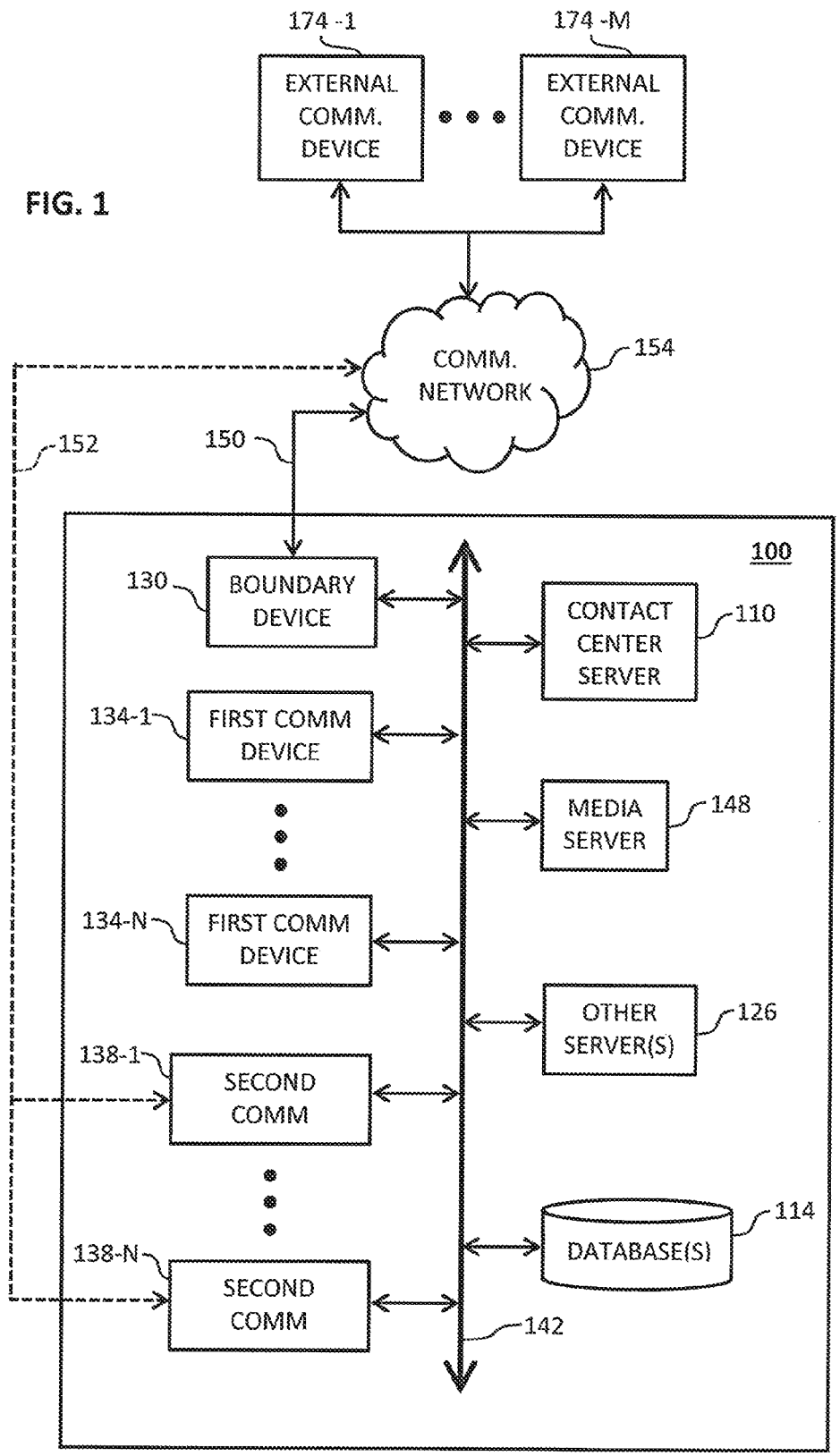
FIG. 1 illustrates a communications system architecture in accordance with the principles of the present disclosure.

The present disclosure will be illustrated below in conjunction with an exemplary communications system. Although well suited for use with, e.g., a system having an Automated Call or Contact Distribution (ACD) system or other similar contact processing switch, the present disclosure is not limited to any particular type of communications system switch or configuration of system elements. Those skilled in the art will recognize that the disclosed techniques may be used in any communications application in which it is desirable to provide improved contact processing.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for illustrative purposes only and should not be construed as limiting of the scope of embodiments of the present disclosure.

The term "a" or "an" entity refers to one or more of that entity. As such, the terms "a" (or "an"), "one or more," and "at least one" may be used interchangeably herein. It is also to be noted that the terms "comprising," "including," and "having" may be used interchangeably.

The term "automatic" and variations thereof, as used herein, refers to any process or operation done without material human input when the process or operation is performed. However, a process or operation may be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer may read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein in connection with embodiments of the present disclosure, the term "contact" refers to a communications from a user or customer. The communications may be by way of any communications medium such as, but not limited to, a telephone call, e-mail, instant message, web chat, and the like. The terms "user" and "customer" denote a party external to the contact center and are used herein to refer to the other party to a contact or a communications session. A user or customer may include, for example, a person requesting assistance for himself or herself or a person requesting assistance for a third party and may also include, for example, a person having a commercial relationship with the contact center or with a business represented by the contact center.

For each "contact" received by the contact center, a computer of the contact center will instantiate a "contact object," which may comprise one or more variables, functions, and data structures that represent the contact. Each contact object comprises a number of attributes, which are assigned values based on its corresponding contact. Each contact object can also include pointers, links or references to other data and/or attributes associated with its corresponding contact. The contact object may be passed amongst the different queues, databases, systems, software applications and other computer-based resources of the contact center. Each contact object may also include a forward reference to another contact object and a backward reference to yet another contact object. In this manner, a prioritized list, or queue, of contact objects may be constructed.

The terms "determine," "calculate," and "compute," and variations thereof, as used herein, are used interchangeably and include any type of methodology, process, mathematical operation or technique.

As used herein, the term "gateway" may generally comprise any device that sends and receives data between devices. For example, a gateway may comprise routers, switches, bridges, firewalls, other network elements, and the like, and any combination thereof.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure may be separately claimed.

As used herein, the term "signal" may include one or more of an electrical signal, a radio signal, an optical signal, an acoustic signal, and so forth.

The terms "switch," "server," "contact center server," or "contact center computer server" as used herein should be understood to include a Private Branch Exchange (PBX), an ACD system, an enterprise switch, or other type of telecommunications system switch or server, as well as other types of processor-based communications control devices such as, but not limited to, media servers, computers, adjuncts, and the like.

Automatic Call or Contact Distribution (ACD) is a communications server software feature that processes incoming, outgoing, and internal calls and distributes them to groups of extensions called hunt groups or splits. The communications server also sends information about the operation of the ACD to a Call Management System (CMS) which stores and formats the data and produces real-time and historical reports on ACD activity. ACD is used by a contact center to route incoming calls to specifically assigned splits/skills and agents. ACD allows a system administrator to create an efficient call management environment.

One or more embodiments of the present disclosure may utilize Session Initiation Protocol (SIP) as a communications protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communications sessions. Examples of the types of communications sessions that may be established using SIP include voice, video, and/or instant messaging. SIP also facilitates peer-to-peer communications sessions. These communications sessions may be carried out on any type of communications device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communications devices associated with the user. Using this AOR, a caller can reach any one of the user's communications devices, also referred to as User Agents (UAs) without having to know each of the unique device addresses or phone numbers.

Users or any other addressable entities in a SIP framework are identified by Universal Resource Identifiers (URI). Each such Internet-style address (for example, sip:johndoe@avaya.com) maps into one or more Contacts, each of which typically represents a device or service at which the corresponding user may be reached. Examples include phones, desktop multimedia clients, instant message accounts, email accounts and so on. The SIP framework is responsible for routing a request for a peer-to-peer session addressed to a given URL to one or more appropriate contacts for that URL. The SIP framework may utilize information about the preferences, presence, and location of the user identified by the URL to determine the most appropriate contacts. The protocol also provides mechanisms to specify the type of session that is requested, as well as means to change session parameters.

SIP is not a vertically integrated communications system. Rather, SIP is a component that may be used with other IETF protocols to build a complete multimedia architecture. Typically, these architectures will include protocols such as Real-Time Transport Protocol (RTP) (RFC 3550) for transporting real-time data and providing Quality of Service (QoS) feedback, the Real-Time Streaming Protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 4566) for describing multimedia sessions. Therefore, SIP may be used in conjunction with other protocols in order to provide complete services to the users. However, the basic functionality and operation of SIP does not depend on any of these protocols.

The Real-Time Transport Control Protocol (RTCP) is a protocol that is known and described in IETC RFC 3550. RTCP provides out-of-band statistics and control information for an RTP media stream. It is associated with RTP in the delivery and packaging of a media stream but does not transport the media stream itself. Typically, the RTP media stream will be sent on an even-numbered user datagram protocol (UDP) port, with RTCP messages being sent over the next higher odd-numbered port. RTCP may be used to provide feedback on the QoS in media distribution by periodically sending statistics information to participants in a streaming multimedia session. Systems implementing RTCP gather statistics for a media connection and information such as transmitted octet and packet counts, lost packet counts, jitter, and round-trip delay time. An application program may use this information to control QoS parameters, for instance by limiting a flow rate or by using a different codec.

FIG. 1 shows an illustrative embodiment of a communications system comprising a contact center 100 according to the present disclosure. The contact center 100 is in communications with one or more external communications devices 174-1 to 174-M via a communications link 150 and a communications network 154, where M is an integer, M≥1. The external communications devices 174-1 to 174-M are associated with one or more contacts or customers and may comprise, for example, cellular phones, laptops, Personal Computers (PCs), Personal Digital Assistants (PDAs), digital phones, analog phones, and the like. The external communications devices 174-1 to 174-M may be configured to support one or more types of streaming media such as an audio media stream and/or a video media stream. The communications network 154 may be packet-switched and/or circuit-switched and may comprise, for example, a Wide Area Network (WAN) such as the Internet, a PSTN, a Plain Old Telephone Service (POTS) network, a cellular communications network, or combinations thereof. A packet-switched network may comprise any data and/or distributed processing network and typically includes proxies (not shown), registrars (not shown), and routers (not shown) for managing packet flows. A circuit-switched network may comprise a plurality of trunks (not separately labeled).

Figure 2:
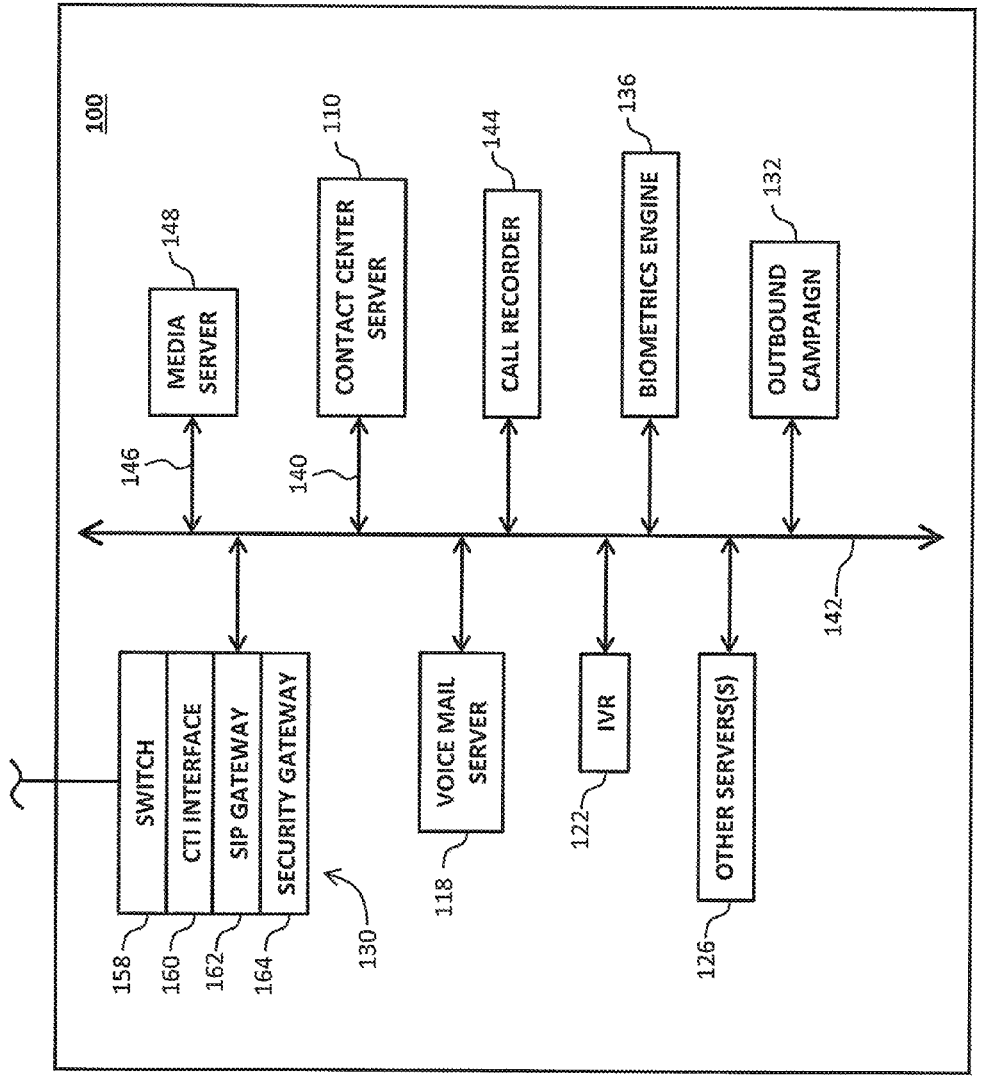
FIG. 2 illustrates aspects of a contact center in accordance with principles of the present disclosure.

As explained in more detail with respect to FIG. 2, the contact center 100 comprises a boundary device 130, a central contact center server 110, a media server 148, one or more other servers 126, and a set of data stores or databases 114 (see FIG. 1) within the contact center 100 containing contact- or customer-related information and other information that may enhance the value and efficiency of the contact processing. Some or all of the components of the contact center 100 may be interconnected by a network 142 such as a local area network (LAN) or WAN. Although one central contact center server 110 is depicted in FIG. 1, two or more servers 110 may be provided in a single contact center 100 or across multiple separate LANs 142 owned and operated by a single enterprise, but separated by the communications network 154. Likewise, two or more media servers 148 may be provided in the contact center 100. In configurations where the contact center 100 includes two or more servers 110 and/or media servers 148, each server 110, 148 may comprise similar functionality, but may be provisioned for providing its features to only a subset of all contact center users. In addition, it should be understood that some or all of the functions depicted in FIGS. 1-3 may be co-hosted and/or co-resident on a single server and/or processor.

The contact center 100 further comprises a plurality of working agents operating packet-switched (first) communications devices 134-1 to 134-N (such as computer workstations or personal computers) and/or circuit-switched (second) communications devices 138-1 to 138-N, where N is an integer, N≥1. The first agent communications devices 134-1 to 134-N may include, for example, IP hardphones such as the 4600 Series IP Phones™ by Avaya Inc., IP softphones such as the IP Softphone™ by Avaya Inc., Personal Digital Assistants (PDAs), Personal Computers (PCs), laptops, packet-based H.320 video phones and conferencing units, packet-based voice messaging and response units, packet-based traditional computer telephony adjuncts, peer-to-peer based communications devices, and any other suitable communications device. In one configuration, the server 110, the network 154, and the first agent communications devices 134-1 to 134-N are SIP compatible and may include interfaces for various other protocols such as the Lightweight Directory Access Protocol (LDAP), H.248, H.323, Simple Mail Transfer Protocol (SMTP), IMAP4, ISDN, E1/T1, and analog line or trunk. The second agent communications devices 138-1 to 138-N may each correspond to one of a set of internal extensions Ext1 to ExtN, respectively, and may include, for example, wired and wireless telephones, PDAs, H.320 videophones and conferencing units, voice messaging and response units, traditional computer telephony adjuncts, and any other suitable communications device. The second agent communications devices 138-1 to 138-N may be in communications with the external communications devices 174-1 to 174-M via one or more link(s) 152. The link(s) 152 is depicted with a dashed line to indicate that it represents a logical representation of the connections between the external communications devices 174-1 to 174-M and the second communications devices 138-1 to 138-N. The actual, physical connection between these devices can include various routing through the network 142, possibly the boundary device 130, and one or more of the servers 110, 148, 126.

It should be noted that the present disclosure does not require any particular type of information transport medium between the components of the contact center 100, i.e., the present disclosure may be implemented with any desired type of transport medium as well as combinations of different types of transport channels. It should also be emphasized that the configuration of the elements of the contact center 100 as shown in FIG. 1 is for purposes of illustration only and should not be construed as limiting the disclosure to any particular arrangement of elements.

FIG. 2 illustrates aspects of a contact center 100 in accordance with principles of the present disclosure comprising a boundary device 130, a contact center server 110, a media server 148, a call recorder 144, a biometrics engine 136, and an outbound campaign 132. The contact center 100 may also comprise a plurality of additional servers, namely a voice mail server 118, an Interactive Response unit (e.g., IVR) 122, and one or more other servers 126. Although depicted as separate servers and/or applications, it should be appreciated that some or all of the functions depicted in FIG. 2 may be co-hosted and/or co-resident on a single server and/or processor, e.g. the contact center server 110.

The contact center server 110 and the media server 148 may each be connected to the LAN 142 via its own respective communications link 140, 146, as shown, or via the switch 158 (not shown). The contact center server 110 may also be connected via one or more optional communications links (not shown) to one or more other components of the contact center 100, including for example, the media server 148, the call recorder 144, the biometrics engine 136, and the outbound campaign 132. As will be appreciated, the one or more other servers 126 may also include a scanner (which is normally not connected to the switch 130), VoIP software, video call software, voice messaging software, an IP voice server, a fax server, a web server, an e-mail server, and the like.

The boundary device 130 may include the functionality of one or more of a switch 158, a computer-telephony integration (CTI) interface 160, a SIP gateway 162, or a security gateway 164. The switch 158 and/or server 110 may comprise any architecture for directing contacts to the one or more agent communications devices 134, 138 (see FIG. 1). In some embodiments, the switch 158 may perform load-balancing functions by allocating incoming or outgoing contacts among a plurality of logically and/or geographically distinct contact centers 100. Illustratively, the switch 158 and/or server 110 may be a modified form of the subscriber-premises equipment sold by Avaya Inc. under the names Definity™ PBX-based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch 158 and/or server 110 is a stored-program-controlled system that conventionally includes interfaces to external communications links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Other types of known switches and servers are well known in the art and therefore not described in detail herein.

As shown in FIGS. 1 and 2, the CTI interface 160 and SIP gateway 162 may facilitate communications between the external communications devices 174-1 to 174-M and the first and second agent communications devices 134, 138. The SIP gateway 162, for example, can connect with one or more SIP trunks from the communications network 154 and split incoming aggregate SIP traffic into individual SIP sessions and aggregate the individual outbound SIP sessions. The security gateway 164 may be positioned between the server 110 and the communications network 154 to process information passing between the server 110 and the communications network 154. The security gateway 164 may be, for example, Avaya Inc.'s, G700 Media Gateway™ and may be implemented as hardware such as via an adjunct processor (as shown) or as a chip in the server 110.

The servers and/or computers of the contact center 100 can also include a context store 127 and a harvest module 129. These two features are shown as separate systems in FIG. 2 but they can also execute on a single server or a single cluster of servers, which can be referred to as an experience manager. The harvest module 129 is configured to build or add data (or relevant information for customers) to the context store 127. The context store 127 includes a database or repository that stores various transit data, for example, data related to customer interaction. An additional database may be utilized by the harvest module 129 to process data, and to store other data. A contact or customer may communicate with disparate systems within the contact center 100 and these systems can retrieve data from the context store 127 or provide data to be stored in the context store 127.

In one embodiment, the harvest module 129 may communicate with a ticketing system, an order tool system, a sentiment analysis engine, a customer relationship management (CRM) system, and a business process management system (BPM) to build or add data to the context store 127. The harvest module 129 may communicate with these systems and provide updated data to the context store 127 according to various contacts that are being handled and monitored within the contact center 100.

In an example, following a customer interaction with an agent of the contact center 100, the harvest module 129 may update the context store 127. In another embodiment, the ticketing system, the order tool system, the sentiment analysis data, the customer relationship management (CRM) system, and the business process management system (BPM) may directly push information, as well as, extract it out of the context store 127.

As an example, the sentiment analysis data may include sentiment of a contact, for example, happy, angry, complain, etc. during an interaction of the contact with a contact center agent.

The CRM updates may include data about any update in customer or contact relation with the enterprise or the contact center. The order update information may include update about the total order placed by the contact. The call/interaction metrics may include call duration, number of participants, was call transferred, was supervisor involved, etc. Further, any component or system of the contact center 100, for example, a self-service system, can access the context store 127, retrieve the context information, update it, change it, put it back in again, and so on and so forth.

The harvest module 129 may harvest relevant data from disparate sources related to customers. For example, the harvest module 129 may harvest relevant data related to the customers from the context store 127. In one embodiment, the harvest module 129 harvests the sentiment analysis data, the CRM updates, the order update information, Post call/interaction survey, Call/interaction metrics, and any interaction context data, as described above. The harvest module 129 gathers this data and other information that has changed during, and in the aftermath of, the customer interaction.

The context store 127 may further store any information, for example, information related to interaction, information related to context of interaction, current information, or case information, and updated information. For example, once an agent finishes a call, the harvest module 129 can start processing and storing the information in the context store 127.

The context store 127 provides a centralized data cache to the various applications in the contact center 100. The context store 127 can provide a RESTful Web Service API so that other applications can set or get context information. While various database schemes may be contemplated, the context information stored about a contact is stored so that the information can be searched and retrieved based on any of a variety of data stored therein. For example, each entry in the context store can include a) a ContextID which is a text field that contains a unique identifier for the context entry; b) the data, which can include multiple key-value pairs; and c) a GroupID which allows logical groups of related context entries to be created.

As described herein, various data, or context, about a contact can be generated, retrieved and stored. This contextual information can include present attributes about the contact, a device associated with the contact, a location of a user associated with the contact, an identity of the user associated with the contact; devices and/or locations associated with past contacts involving the associated user or user device, social media information about the user associated with the contact, and past purchases, past inquiries, group affiliation and demographic information about the user associated with the contact. The contextual information can also include various information about contact center resources, agents, and problem resolution associated with past interactions with the user associated with a contact.

Although some embodiments are discussed with reference to a client-server architecture, it is to be understood that the principles of the present disclosure apply to other network architectures. For example, the present disclosure applies to peer-to-peer networks, such as those envisioned by SIP. In the client-server model or paradigm, network services and the programs used by end users to access the services are described. The client side provides a user with an interface for requesting services from the network, and the server side is responsible for accepting user requests for services and providing the services transparent to the user. By contrast, in the peer-to-peer model or paradigm, each networked host runs both the client and server parts of an application program. Additionally, the disclosure does not require the presence of packet- or circuit-switched networks.

Figure 3:
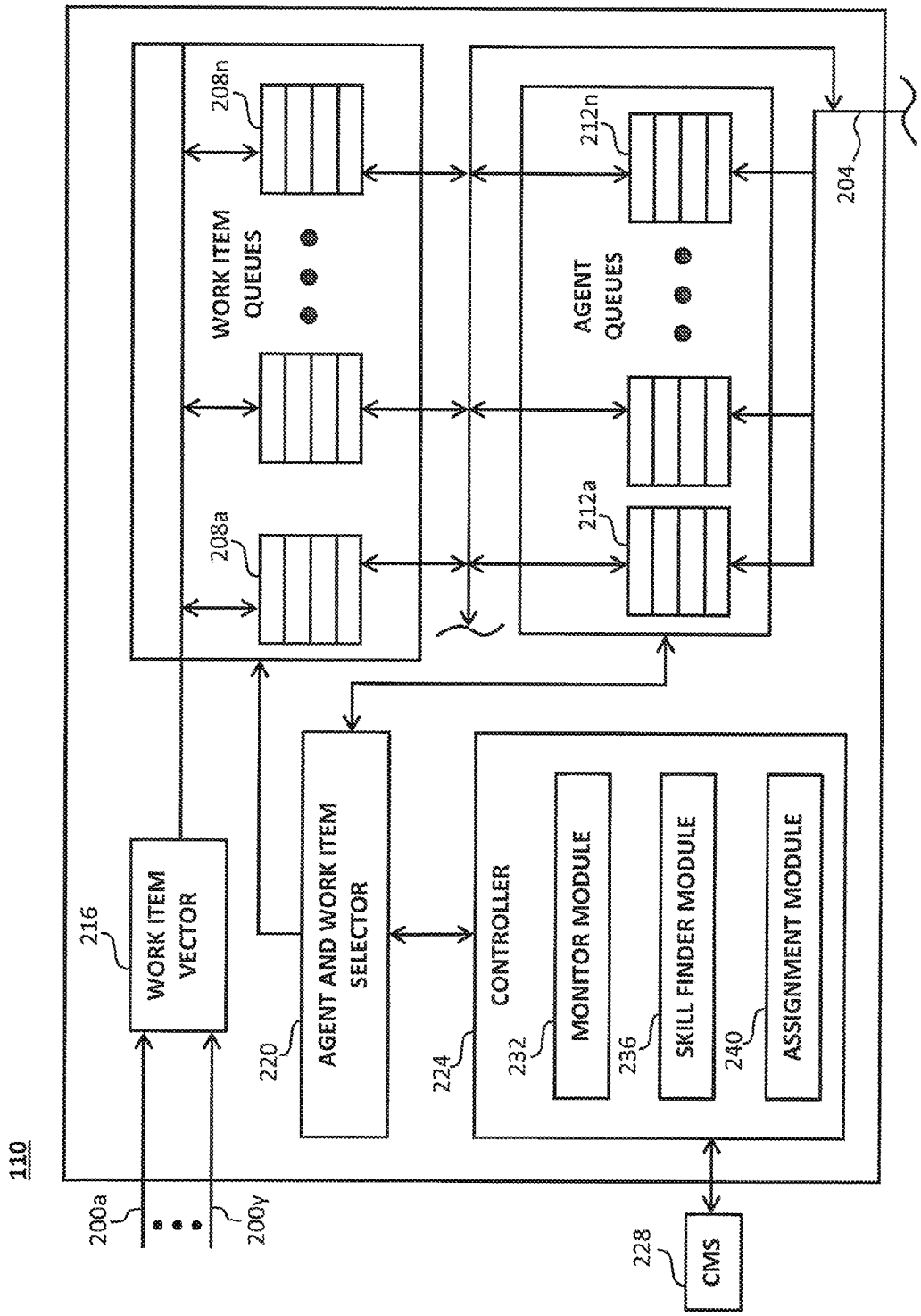
FIG. 3 illustrates a contact center server in accordance with principles of the present disclosure.

Referring to FIG. 3, one possible configuration of the central server 110 of a contact center 100 is depicted. The server 110 is in communications with a plurality of customer communications lines 200a-y (which may be one or more trunks, phone lines, etc.) and an agent communications line 204 (which may be a voice-and-data transmission line such as LAN 142 and/or a circuit switched voice line). The server 110 may include Avaya Inc.'s Operational Analyst™ (OA) with On-Line Analytical Processing (OLAP) technology or a Call Management System (CMS) 228 that gathers contact records and contact-center statistics for use in generating contact-center reports. The OA and the CMS will hereinafter be referred to jointly as CMS 228.

As may be seen in FIG. 3, included among the data stored in the server 110 is a set of work item queues 208a-n and a separate set of agent queues 212a-n. Each work item queue 208a-n corresponds to a different set of agent skills, as does each agent queue 212a-n. Conventionally, work items are prioritized and are either enqueued in individual ones of the work item queues 208a-n in their order of priority or in different ones of a plurality of work item queues 208a-n that correspond to a different priority. Likewise, each agent's skills are prioritized according to his or her level of expertise in that skill, and agents are either enqueued in individual ones of agent queues 212a-n in their order of expertise level or in different ones of a plurality of agent queues 212a-n that correspond to a skill and each one of which corresponds to a different expertise level.

Included among the control programs in the server 110 is a work item vector 216. Contacts incoming to the contact center are assigned by the work item vector 216 to different work item queues 208a-n based on a number of predetermined criteria, including customer identity, customer needs, contact center needs, current contact center queue lengths, customer value, and the agent skill that is required for the proper handling of the contact. Agents who are available for handling work items are assigned to agent queues 212a-n based on the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels.

In one configuration, the contact center may be operated by a contract operator, and each of the work item queues 208a-n, and possibly each of the agent queues 212a-n, corresponds to a different client. Each client may have a separate service level agreement or other type of performance measurement agreement with the contract operator regarding performance expectations, goals, requirements or specifications for the client's respective queue(s). The service level agreement may set forth penalties, such as financial penalties, for failing to comply with the service level agreement's requirements.

The contact center server 110 may be notified via the LAN 142 of an incoming work item by the communications component (e.g., the switch 130, fax server, e-mail server, web server, and/or other server) receiving the incoming work item. The incoming work item is held by the receiving telecommunications component until the server 110 forwards instructions to the component to forward or route the contact to a specific contact center resource, such as the IVR 122, one or more of the other servers such as a voice mail server 118, and/or a first or second agent communications device 134, 138 associated with a selected agent.

The server 110 distributes and connects these work items to first or second agent communications devices 134, 138 of available agents based on the predetermined criteria noted above. When the server 110 forwards a voice contact (or first work item) to an agent, the server 110 also forwards customer-related information from the database(s) 114 to the agent's computer work station for viewing (such as by a pop-up display) to permit the agent to better serve the customer. Depending on the contact center configuration, the server 110 may forward a list of work items to an available agent to preview before forwarding the work item itself and the data associated therewith to the agent. The agents process the work items or contacts sent to them by the server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

According to an embodiment of the present disclosure, also included among the programs executing on the server 110 are an agent and work item selector 220 and a controller 224, as shown in FIG. 3. The selector 220 and the controller 224 are stored either in the main memory or in a peripheral memory (e.g., disk, CD ROM, etc.) or some other computer-readable medium of the contact center 100. The selector 220 and the controller 224 collectively effect an assignment between available work items (or contacts) and available agents in a way that tends to maximize contact center efficiency for the current contact center state. The selector 220 uses predefined criteria in selecting an appropriate agent to service the work item. The controller 224 assists the work item vector 216 in routing the contacts to the appropriate work item queue(s) 208a-n and the selector 220 in routing a contact to a most desirable agent in the agent queue(s) 212a-n. The controller 224, in particular, obtains, for each of a plurality of contact center goals or objectives, status information, or information respecting whether or not a corresponding goal (for example, the service level agreement) is being met or unmet and/or a level to which the corresponding goal is being met or unmet.

Agent and customer profiles are typically maintained and updated by a profile generator (not shown). Upon the completion of handling a work item, the generator may collect selected metrics for the work item. These metrics include the skill involved in servicing the work item, the identifier of the servicing agent, the contact duration, the transaction or contact type (e.g., catalog sale, information request, complaint, etc.), the time-of-day, the result (e.g., the type of sale, the number of units sold, revenue generated, service ticket closure or escalation, the information provided, etc.), a self-rating of the servicing agent respecting the agent's proficiency in handling the work item, the rating of the customer of the agent's proficiency in handling the work item, the rating of another party, such as the agent's supervisor or another observer, of how the work item was serviced, whether the agent requested assistance, and whether the agent's training was completed, and stores the information in the database(s) 114, such as CMS 228. The metrics over a selected period of time are typically stored under each agent's profile and may include metrics associated with a plurality of work items serviced by the agent for each agent skill. Each agent's profile may also contain his or her skills and/or level(s) of skill expertise. Each customer profile includes metrics associated with a plurality of contacts by the customer.

The controller 224 has access to various performance measures of each of the agent resources and the contact handling history of the resources in the system. The controller 224 is also configured to use various systems, known in the art, to assess the performance of individual agent resources in processing work items. The controller 224 is further configured to find an area of competency for each of the agent resources based on their performance measures and contact handling history. The controller 224 is further configured to utilize such findings in maximizing contact center efficiency.

As mentioned above, the CTI interface 160 and SIP gateway 162 may facilitate communications between the external communications devices 174-1 to 174-M and the first and second agent communications devices 134, 138. The SIP gateway 162, for example, can connect with one or more SIP trunks from a provider's communications network 154 and split incoming aggregate SIP traffic into individual SIP sessions and aggregate the individual outbound SIP sessions, such as, for example, Avaya Inc.'s Session Border Controller™.

In addition, the contact center can include an ISDN gateway (not shown) that can, for example, connect with one or more ISDN trunks from a provider's network such that an ISDN interface is implemented on the provider's network side of the ISDN gateway and a SIP interface is implemented on the contact center's side of the ISDN gateway, such as, for example, Avaya Inc.'s Communication Manager™. The ISDN gateway receives ISDN-based messages from the provider's network such as, for example, from a central office (CO) of the public switched telephone network (PSTN) and generates a corresponding SIP-based message that is sent to one or more computers or systems within the contact center. In the opposite direction, the ISDN gateway receives a SIP-based message from within the contact center and generates a corresponding ISDN-based message that is sent to the provider's network. In this way, a SIP session (i.e., an ongoing call) within the contact center is associated with a corresponding ISDN call within the provider's network. Regardless of whether one or both of the different gateways are present, a SIP session within the contact center 100 can be connected with one or more applications, or servers (e.g., server 110) such as, for example, Avaya Inc.'s Oceana™ within the contact center 100. This application or server within the contact center 100 that participates in the SIP session may change during different phases of the ongoing call such that the SIP-based messages are sent to these other servers such as, for example, Avaya Inc.'s Aura Contact Center™ or Aura Experience Portal™. The contact center server may receive SIP-based messages from the direction of the provider network (e.g., from the ISDN gateway or SIP gateway 162) and provide outgoing SIP-based messages (e.g., to the ISDN gateway or SIP gateway 162) to cause ISDN-based messages or SIP-based messages to be sent to provider network 154. Within the contact center 100, this server, or another server, can manage a SIP session (i.e., an ongoing call) via, for example, a conference bridge in which different parties are connected and disconnected to the conference bridge during the ongoing call so that "media" can be exchanged between the connected parties. The parties can include the caller, human agents and supervisors affiliated with the contact center but can also include different media streams, on hold music, advertisements, monitor or recording connections, IVR menus, etc. The SIP messages and the SIP session provide the control mechanisms for managing what parties are connected with an ongoing call.

In FIGS. 4A-4D various exchanges of protocol messages between a provider network (e.g., PSTN) and the contact center 100 are depicted and are described below. In the following description, the example message exchanges relate to ISDN-based messages and SIP-based messages. One of ordinary skill will readily recognize that if the provider network were connected via a SIP-based trunk, then the SIP-based messages could be received and sent by the contact center without involving any ISDN messages. Furthermore, other functionally equivalent in-band or out-of-band message passing paradigms could be utilized as well without departing from the scope of the present disclosure.

Figure 4A:
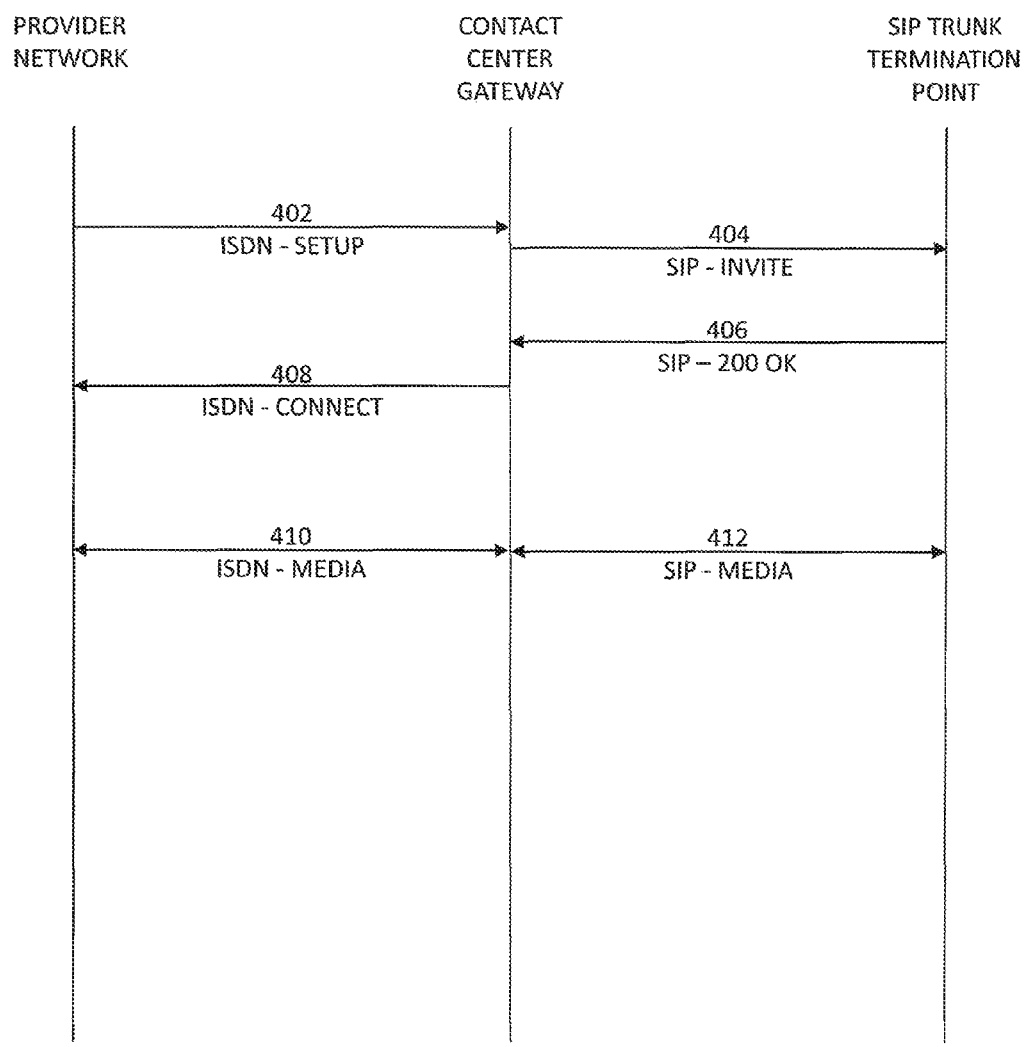
FIG. 4A illustrates a diagram of an exchange of protocol messages.
Figure 4B:
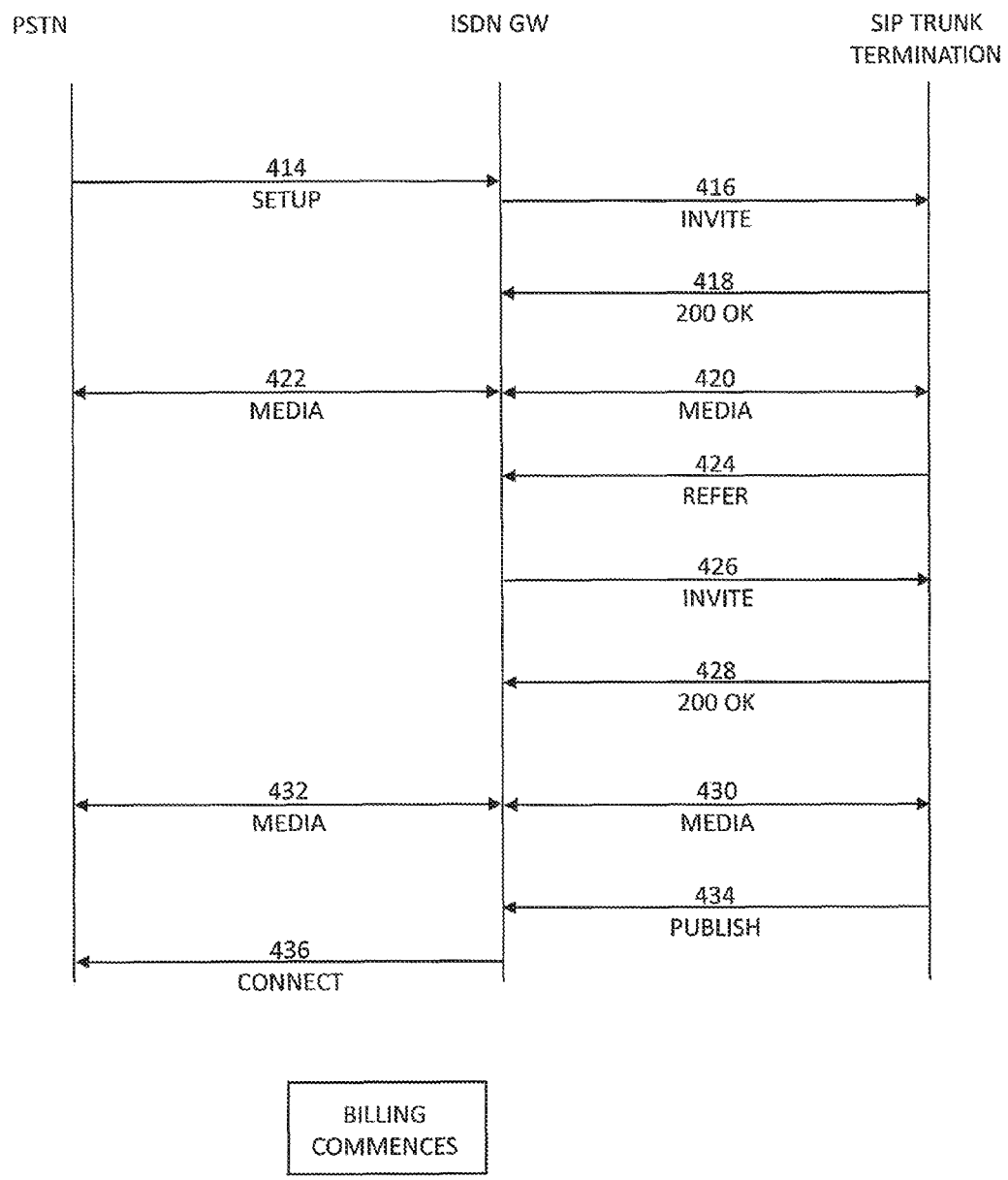
FIGS. 4B-4D illustrate diagrams of exchanges of protocol messages in accordance with the principles of the present disclosure.
Figure 4C:
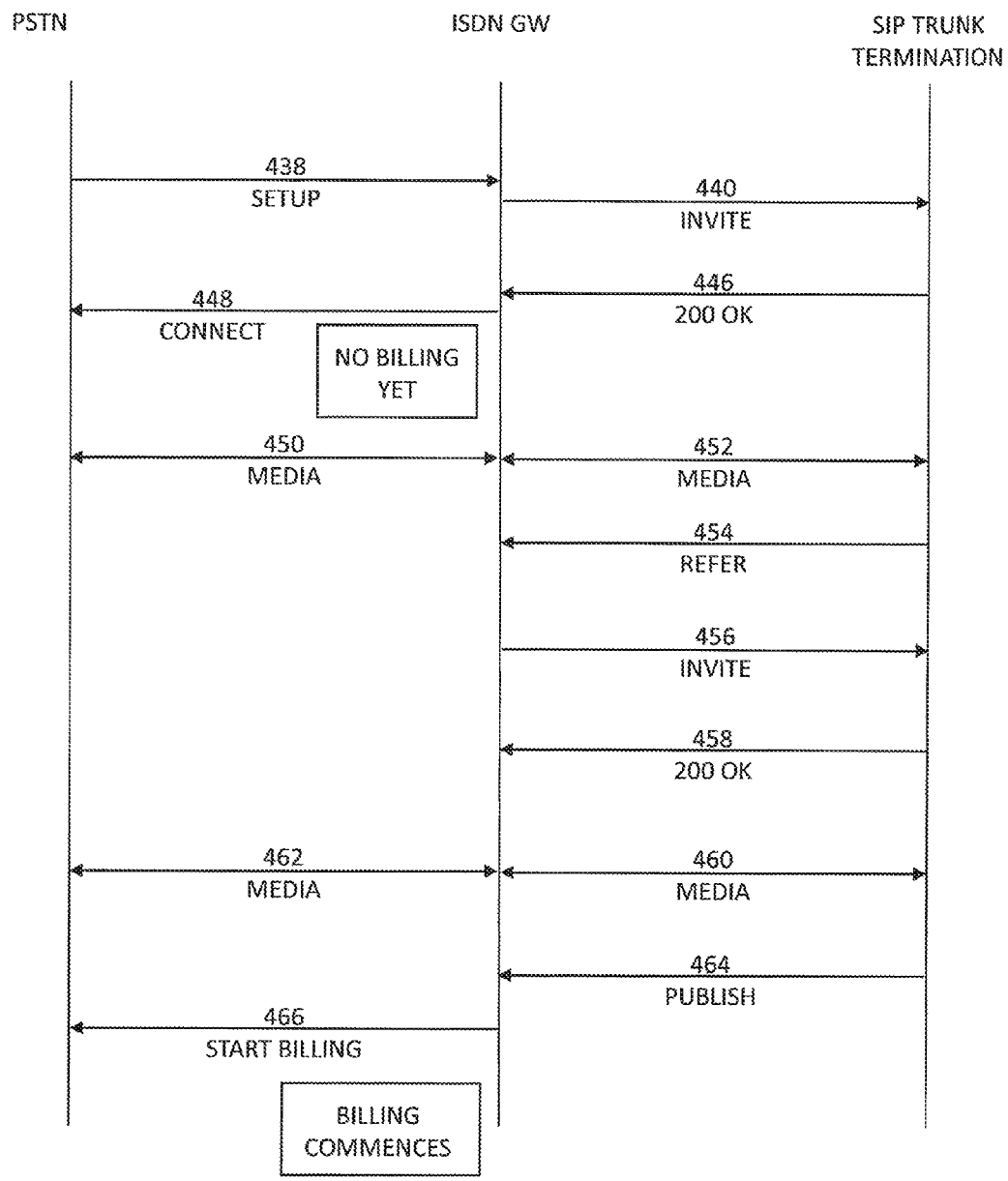
Figure 4D:
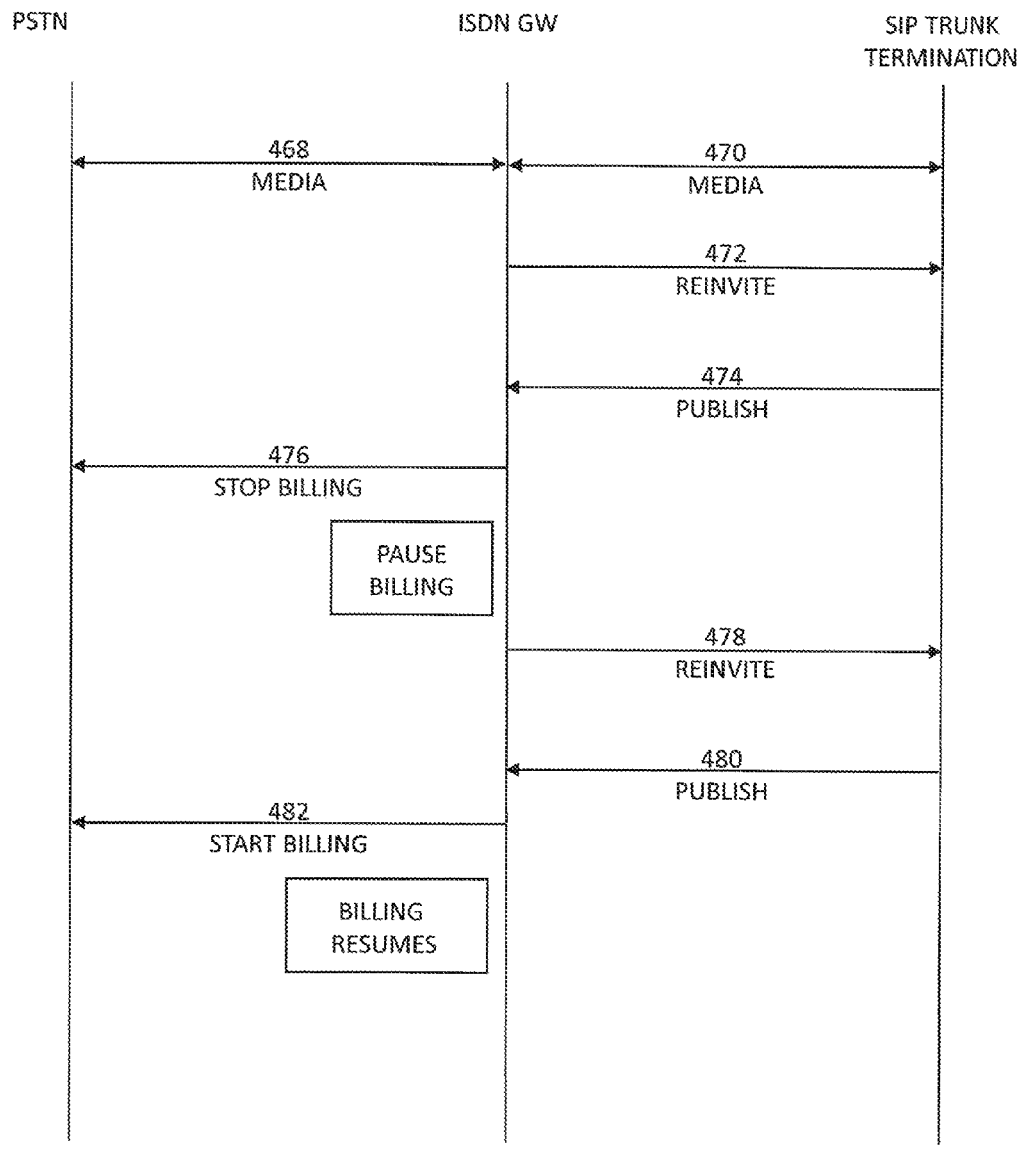

FIG. 4A illustrates a diagram of an exchange of protocol messages to start a call. An ISDN SETUP message (402) is received from the provider's network 154 and the contact center gateway will generate a SIP INVITE message (404) that is forwarded to an application or server within the contact center 100. For example, the INVITE message can be forwarded to a server such as Oceana™ which creates a conference bridge to which a human agent or automated agent can be connected. Connection of one of those agents, or another system (e.g., IVR menu, wait music, etc.) causes a "200 OK" message (406) to establish a SIP session. In response to receiving the 200 OK message (406), the contact center gateway sends a CONNECT message (408) to the provider's network. In response, the provider's network commences billing for the call and media (i.e., 410, 412) are exchanged by an appropriate protocol during the ongoing call. In the above-described scenario, billing commences for the call even if the connected agent was an automated agent rather than a human agent. As mentioned above, there may be instances when it is beneficial to distinguish between when a live agent rather than an automated agent is connected with an ongoing call so that a bill for the call reflects only that portion of the call when a live agent was connected. FIGS. 4B-4D relate to example message exchanges that address billing during times when a human agent is connected with an ongoing call and pausing billing for times when the human agent is not connected with the ongoing call.

FIGS. 4B-4D illustrate diagrams of exchanges of protocol messages in accordance with the principles of the present disclosure. In these message exchanges, a server or application within the contact center 100 (e.g., Avaya Inc.'s Oceana™, Aura Contact Center™, Aura Experience Portal™, etc.) can enhance conventional SIP-based messages so that the provider's network (e.g., a CO of the PSTN) can be informed when to start, pause and resume billing depending on whether or not a human agent is connected with the call. In other words, the contact center application, or server, provides a SIP message that is effective to notify the provider's network when a human agent has joined or left an ongoing call.

SIP includes a number of different messages that can be used for the purpose of causing the provider's network to be notified when a human agent has joined or left a call. For example, INFO, NOTIFY, PUBLISH and MESSAGE are all SIP messages that can comprise a payload that informs the contact center gateway whether or not a human agent is connected to the SIP session (i.e., the ongoing call). In the examples described below, the PUBLISH message is used but the other types of SIP messages could also be used without departing from the scope of the present disclosure. The PUBLISH message is described in RFC 3903 which is incorporated herein by reference in its entirety.

In one example of an incoming call, see FIG. 4B, the contact center gateway may receive the "200 OK" message from a contact center server but suppress the ISDN-based CONNECT message it would normally send out in response. When the contact center gateway receives a PUBLISH message with information that a human agent is connected to the ongoing call, from the server currently managing the ongoing call, then the contact center gateway can generate an appropriate message to the provider network which causes billing to start (e.g., the ISDN CONNECT message).

In FIG. 4B, the SETUP message (414) is received by the contact center gateway and an INVITE message (416) is sent to a server, such as, for example, an automated agent. A "200 OK" message (418) is returned to the gateway and the media (420, 422) can be established.

The automated agent can send the contact center gateway a REFER message (424) asking that the call be transferred to another recipient. The contact center gateway sends out a new INVITE message (426) to a server that may provide an initial greeting to the caller and then connect a human agent with the ongoing call when the agent is available. The server initially sends a "200 OK" message (428) that once again causes media (430, 432) to be exchanged over the ongoing call. Yet no billing is taking place on the provider's network. Subsequently, the server determines when a human agent is connected with the call. The discussion above with respect to FIGS. 1-3 provided a detailed explanation of a contact center and example work assignment procedures. In any of the various ways that a terminal of an agent can be connected to the SIP session, the server detects this connection and determines that a human agent, rather than an automated agent, is now connected with the ongoing call.

The server generates the PUBLISH message (434) that comprises data that indicates a human agent is connected to the ongoing call. In response, the contact center gateway generates the CONNECT message (436) for the provider's network. Once the CONNECT message (436) is received, then billing on the provider's network can commence. Thus, the CONNECT message (436), because of the timing at which it is sent by the contact center indicates to the provider's network that a human agent is now connected with the ongoing call.

As an alternative example, see FIG. 4C, the start of a call and SIP session can involve the message exchange depicted in FIG. 4A. However, in this example, the provider's network does not start billing when the CONNECT message is received; instead it waits for a new type of message to indicate billing should begin. When the contact center gateway receives a PUBLISH message with information that a human agent is connected to the ongoing call, from the server currently managing the ongoing call, then the contact center can generate this new ISDN-based message to the provider network which causes billing to start.

In FIG. 4C, an ISDN SETUP message (438) is received from the provider's network 154 and the contact center gateway will generate a SIP INVITE message (440) that is forwarded to an application or server within the contact center 100. Connection to a server within the contact center causes a "200 OK" message (446) to establish a SIP session. In response to receiving the 200 OK message (446), the contact center gateway sends a CONNECT message (448) to the provider's network. When the server handling the call is an automated agent, or has connected an automated agent to the call, the PUBLISH message that results in billing commencing is not generated yet. In response to the CONNECT message (448), the provider's network does not commence billing but can establish the call so that media 450, 452 can be exchanged.

The automated agent can send the contact center gateway a REFER message (454) asking that the call be transferred to another recipient. The contact center gateway sends out a new INVITE message (456) to a server that may provide an initial greeting to the caller and then connect a human agent with the ongoing call when the human agent is available. The server initially sends a "200 OK" message (458) that once again causes media (460, 462) to be exchanged over the ongoing call. Yet no billing is taking place on the provider's network. Subsequently, the server determines when a human agent is connected with the call. The discussion above with respect to FIGS. 1-3 provided a detailed explanation of a contact center and example work assignment procedures. In any of the various ways that a terminal of an agent can be connected to the SIP session, the server detects this connection and determines that a human agent, rather than an automated agent, is now connected with the ongoing call.

The server generates the PUBLISH message (464) that comprises data that indicates a human agent is connected to the ongoing call. In response, the contact center gateway generates a new ISDN message such as, for example, a START BILLING message (466) for the provider's network. Once the START BILLING message (466) is received, then billing on the provider's network can commence. This new type of ISDN message indicates to the provider's network that a human agent (and not an automated agent) is connected with the ongoing call.

The example message exchange of FIG. 4C can be further extended to include a PUBLISH message that comprises data that indicates a human agent has left the ongoing call and an automated agent is now connected to the call. For example, the ongoing call could be placed on hold such that a media server streaming hold music, advertisements, or other information could be connected with the ongoing call. The ongoing call could also be transferred from the human agent back to an IVR menu or transferred to some other automated agent. The different, respective PUBLISH messages could comprise data that indicates what specific type of automated agent is now connected with the ongoing call or there could be a PUBLISH message that is generic to all possible automated agents to indicate that the human agent is no longer connected with the ongoing call.

FIG. 4D continues from FIG. 4B with media (468, 470) being exchanged while billing is occurring. The human agent can cause a REINVITE message (472) to be sent from the contact center gateway, for example, by placing the call on hold. The server (e.g., server 110) which connected the human agent to the ongoing call detects that the human agent is no longer connected and sends the PUBLISH message (474) that comprises data that indicates that an automated agent, rather than a human agent, is now connected with the ongoing call. For example, the REINVITE message (474) can be analyzed by the server to determine whether the human agent has put the call on hold. Alternatively, the CTI interface (See FIG. 2, element 160) can automatically inform the contact center server 110 when the live agent places an ongoing call on hold or picks up an on hold call. Thus, when a call is put on hold the contact center gateway will generate a new ISDN message such as, for example, a STOP BILLING message (476). When the provider's network receives the STOP BILLING message (476), the provider's network will pause billing for the ongoing call. In other words, the STOP BILLING message (476) is sent to the provider's network to indicate that an automated agent rather than a human agent is currently connected with the ongoing call.

When the human agent "un-holds" the call, a REINVITE message (478) is generated by the contact center gateway and sent to the server handling the ongoing call. The server can therefore determine that the human agent is re-connected to the ongoing call and generate the PUBLISH message that comprises data indicating that the human agent instead of an automated agent is now connected with the ongoing call. This PUBLISH message (480) can be the same as the PUBLISH message (464) used to start billing; or the PUBLISH message (480) could be different to distinguish between when billing should resume as opposed to when billing should start.

Assuming, the PUBLISH messages (464, 480) are the same, the contact center gateway generates the START BILLING message (482) so that the provider's network resumes billing for the ongoing call. In other words, the START BILLING message (482) is sent to the provider's network to indicate that a human agent rather than an automated agent is currently connected with the ongoing call.

In the above description, the provider's network was considered to be an ISDN network by way of example. One of ordinary skill will recognize that if the provider's network were a SIP-based network, then the PUBLISH messages could be exchanged directly without generating START BILLING and STOP BILLING messages. The provider's network would simply use the PUBLISH messages to start and stop billing in an appropriate manner.

The PUBLISH messages described above, or similar messages (e.g., NOTIFY) can typically be related to an established subscription, as described in RFC 3903. However, the messages could also be sent "out-of-dialog" as well without departing from the scope of the present invention. Similarly, alternatives to in-band SIP messages are contemplated as well within the scope of the present disclosure. For example, the CO of the provider's network and the server or application within the contact center can establish a connection over some other protocol in addition to the SIP session/ISDN call. The provider's network could provide a system implementing a RESTful interface to which the server of the contact center could send messages (e.g., POST messages) using HTTP that indicate whether or not a human agent is connected to an ongoing call. Such a message would identify the ISDN call with an identifier recognized by the provider's network along with information indicating whether or not billing should be occurring.

As an additional augmentation, a call may be part of an expert consultation or similar service for which a business entity, in addition to the provider network, may want to produce a bill for the call. In such an environment, the PUBLISH (or similar) message that indicates billing should start may also include data related to a billing rate of the human agent (e.g., the consultant or expert) connected with the call. These PUBLISH messages could be sent to both the business entity as well as the provider network. Another example PUBLISH message could indicate the number of live agents participating in the call which possibly could be billed at a different rate than a call with only a single live agent connected. A combination of the above two examples would be a PUBLISH message that had the number of agents and their respective billing rate. This combination of information could be used to determine a billing rate for the call and this could vary as different agents drop from or join the call. Each such occurrence would produce an appropriate PUBLISH message so that the changing billing rate can be determined in near real time (i.e., during the ongoing call).

Figure 5A:
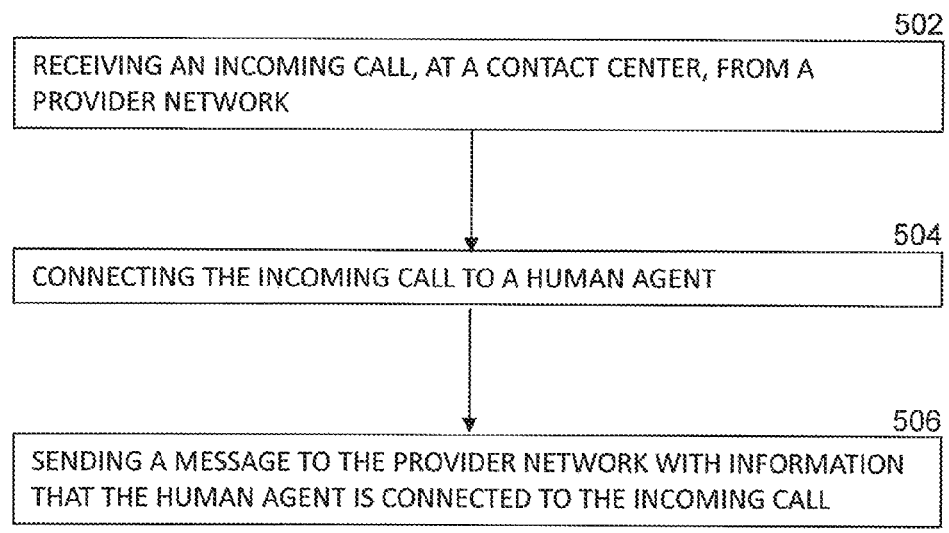
FIGS. 5A-5C are flowcharts of exemplary methods for performing computer implemented methods at an enterprise in accordance with the principles of the present disclosure.
Figure 5B:
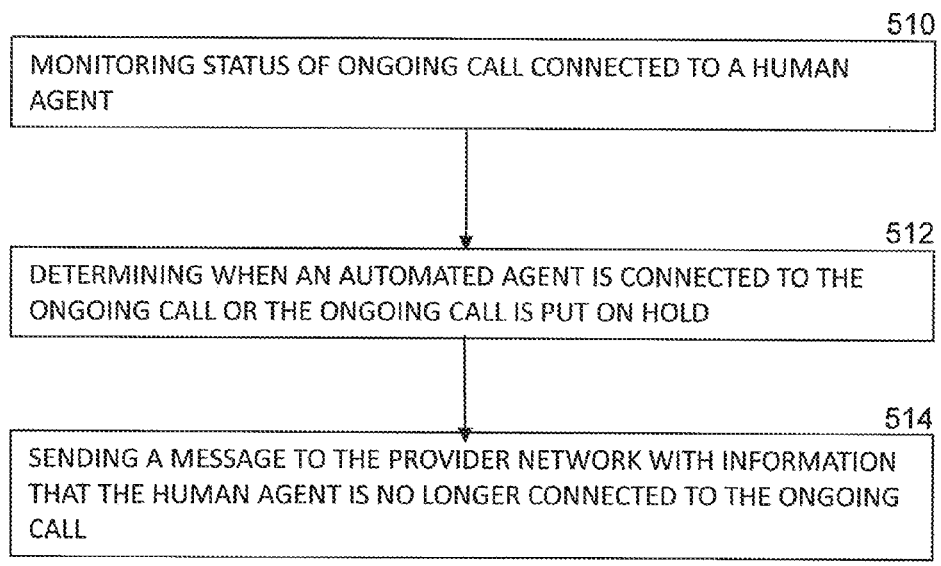
Figure 5C:
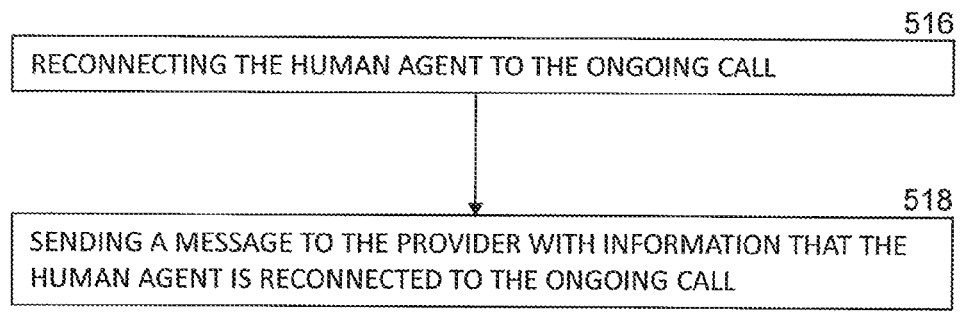

FIGS. 5A-5C are flowcharts of exemplary methods for performing computer implemented methods at an enterprise in accordance with the principles of the present disclosure.

In FIG. 5A, an incoming call is received, in step 502, at a contact center from a provider network trunk such as, for example, an ISDN trunk or SIP trunk. The incoming call may initially be connected with an automated agent for a time period for which the provider network does not bill the caller. In step 504, the incoming call is connected with a human agent. Different servers and/or applications of the contact center manage an ongoing call at various times that the contact center is handling the call. At all times there is at least one server that determines the contact center agent or system that is connected with the ongoing call. Thus, the parties actively coupled with a conference bridge within the contact center hosting the ongoing call can be analyzed by the server to determine if a terminal of a human agent is connected with the ongoing call. This server, in step 506, causes a message to be sent to the provider network with information that the human agent and not an automated agent is connected with the ongoing call. As discussed above, this message can be, for example, a typical CONNECT message whose timing is controlled such that it is not sent by the contact center until a human agent is connected with the ongoing call. Alternatively, the message could be a new type of message (e.g., START BILLING) that is not sent until a human agent is connected with the ongoing call. The server causes this message to be sent by utilizing an augmented SIP-based message (e.g., PUBLISH message) that indicates a human agent is connected to the ongoing call.

In FIG. 5B, the ongoing call is monitored so that the status of whether or not the human agent is still connected can be determined. For example, the transfer of the call associated with a SIP session to different entity can be detected from the data within the SIP messages that accomplish that transfer. The SIP messages that result from the human agent placing a call on hold or taking it off of hold also contain data that indicates whether or not the human agent is currently connected with the SIP session (i.e., the ongoing call). Thus, in step 512, the server detects when the ongoing call is put on hold or transferred to an automated agent. This determination of being on hold can, for example, include determining the ongoing call was transferred to another human agent who is not yet available. In step 514, as a result of the determination in step 512, the server causes a message to be sent to the provider network that the human agent is no longer connected with the ongoing call. The message could be a new type of message (e.g., STOP BILLING) that is sent when a human agent is not connected with the ongoing call. The server causes this message to be sent by utilizing an augmented SIP-based message (e.g., PUBLISH message) that indicates a human agent is not connected to the ongoing call. In response, the provider network can pause billing for the call in their network.

Monitoring of the ongoing call continues whether the ongoing call is connected with an automated agent or a human agent. While one central application or server could perform this monitoring, the responsibility for monitoring the call can change from server to server depending on what system or server within the contact center last handled the ongoing call. Thus, in step 516, the server reconnects the human agent to the ongoing call. For the purposes of the present disclosure, reconnecting the same human agent or connecting a new human agent to the ongoing call are functional equivalents. This is because in either instance the server, in step 518, causes a message to be sent to the provider network with information that a human agent has been reconnected to the ongoing call. The message could be a new type of message (e.g., START BILLING) that is not sent until a human agent is connected with the ongoing call. The server causes this message to be sent by utilizing an augmented SIP-based message (e.g., PUBLISH message) that indicates a human agent is connected, or re-connected, to the ongoing call. In response, the provider network can resume billing for the call in their network.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). In addition, while the flowcharts have been discussed and illustrated in relation to a particular sequence of events, it should be appreciated that changes, additions, and omissions to this sequence may occur without materially affecting the operation of the disclosure. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following:

a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA, SCALA, SMALLTALK, EIFFEL, JADE, EMERALD, C++, CII, VB.NET, PYTHON or the like, conventional procedural programming languages, such as the "c" programming language, VISUAL BASIC, FORTRAN 2003, PERL, COBOL 2002, PHP, ABAP, dynamic programming languages such as PYTHON, RUBY, and GROOVY, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Alternatively, a symmetric multiprocessor (SMP) system or other configuration including a plurality of processors may be used.

These computer program instructions may also be stored in a computer readable medium that when executed may direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions that execute on the computer or other programmable apparatus provide processes for implementing the functions/acts specified in the flowchart and/or block diagram block or blocks.

While the exemplary embodiments illustrated herein show the various components of the system collocated, certain components of the system may be located remotely, at distant portions of a distributed network, such as a LAN and/or the Internet, or within a dedicated system. Thus, it should be appreciated, that the components of the system may be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system may be arranged at any location within a distributed network of components without affecting the operation of the system. For example, the various components may be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements may be wired or wireless links, or any combination thereof, or any other known or later developed element(s) that is capable of supplying and/or communicating data to and from the connected elements. These wired or wireless links may also be secure links and may be capable of communicating encrypted information. Transmission media used as links, for example, may be any suitable carrier for electrical signals, including coaxial cables, copper wire, and fiber optics, and may take the form of acoustic or light waves, such as those generated during radio-wave and infra-red data communications.

Figure 6:
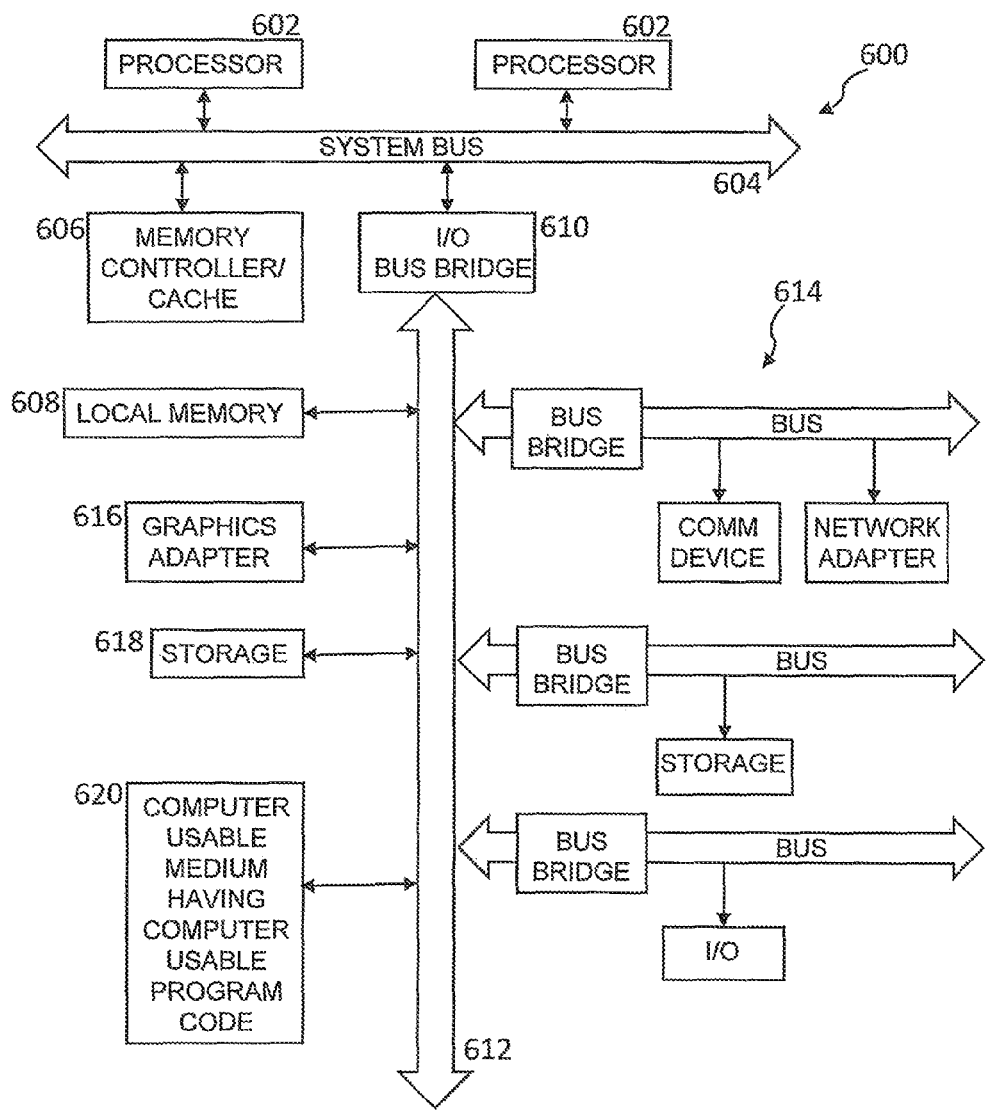
FIG. 6 illustrates an example computer platform in accordance with the principles of the present disclosure.

Referring to FIG. 6, a block diagram of a data processing system is depicted in accordance with the present disclosure. A data processing system 600, such as may be utilized to implement the computers or aspects thereof, e.g., as set out in greater detail in FIG. 1-FIG. 5C, may comprise a symmetric multiprocessor (SMP) system or other configuration including a plurality of processors 602 connected to system bus 604. Alternatively, a single processor 602 may be employed. Also connected to system bus 604 is memory controller/cache 606, which provides an interface to local memory 608. An I/O bridge 610 is connected to the system bus 404 and provides an interface to an I/O bus 612. The I/O bus may be utilized to support one or more busses and corresponding devices 614, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 616, storage 618 and a computer usable storage medium 620 having computer usable program code embodied thereon. The computer usable program code may be executed to execute any aspect of the present disclosure, for example, to implement aspect of any of the methods, computer program products and/or system components illustrated in FIG. 1-FIG. 5C.

A number of variations and modifications of the disclosure may be used. It would be possible to provide for some features of the disclosure without providing others. For example, in one alternative embodiment, the systems and methods of this disclosure may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein may be used to implement the various aspects of this disclosure. Exemplary hardware that may be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing may also be constructed to implement the methods described herein.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the present disclosure to the precise form disclosed. Modifications and variations are possible in light of the above teachings or may be acquired from practice of the present disclosure.

What is claimed is:

1. A method for tracking a status of an ongoing call, comprising:
   determining, by a computer of a contact center, that a human agent is presently connected with the ongoing call that originated from a provider network;
   subsequent to determining that the human agent is connected with the ongoing call, monitoring, by a computer of the contact center, the ongoing call while the ongoing call is connected with the human agent;
   based on the monitoring of the ongoing call connected with the human agent, determining, by the computer of the contact center, when an automated agent instead of the human agent is connected with the ongoing call; and
   in response to determining that the automated agent instead of the human agent is connected with the ongoing call, sending, by the computer of the contact center, a first message to the provider network,
      wherein the first message comprises first data indicative that the automated agent instead of the human agent is connected with the ongoing call.

2. The method of claim 1, wherein determining comprises:
   detecting, by the computer of the contact center, when the ongoing call is transferred from the human agent of the contact center to the automated agent.

3. The method of claim 1, wherein the ongoing call comprises a session initiation protocol (SIP) based call.

4. The method of claim 1, wherein the automated agent comprises an interactive voice response (IVR) system.

5. The method of claim 1, wherein the provider network comprises an ISDN network.

6. The method of claim 5, wherein the computer of the contact center communicates with an ISDN gateway connected to the provider network and sending the first message comprises:
   sending, by the computer of the contact center, a SIP-based message to the ISDN gateway.

7. The method of claim 1, comprising:
   determining, by the computer of the contact center, when the ongoing call connected with the human agent is placed on hold; and
   in response to determining the ongoing call connected with the human agent is placed on hold, sending, by the computer of the contact center, a second message to the provider network,
      wherein the second message comprises data indicative of the ongoing call being placed on hold.

8. The method of claim 7, comprising:
   subsequent to the ongoing call being placed on hold, determining, by the computer of the contact center, when the human agent takes the ongoing call off hold; and
   in response to the ongoing call being taken off hold, sending, by the computer of the contact center, a third message to the provider network,
      wherein the third message comprises data indicative that the human agent is connected with the ongoing call.

9. The method of claim 1, comprising:
   subsequent to determining that the automated agent instead of the human agent is connected with the ongoing call, reconnecting, by the computer of the contact center, the human agent to the ongoing call; and
   in response to reconnecting the human agent to the ongoing call, sending, by the computer of the contact center, a second message to the provider network,
      wherein the second message comprises first data indicative that the human agent is reconnected with the ongoing call.

10. The method of claim 9, wherein the second message comprises second data indicative of a billing rate associated with the human agent.

11. A system for tracking a status of an ongoing call that originated from a provider network, comprising:
- a memory device storing executable instructions;
- a processor in communication with the memory device, wherein executing the executable instructions by the processor causes the processor to:
  - determine that a human agent is presently connected with the ongoing call;
  - subsequent to determining the ongoing call is connected with the human agent, monitor the ongoing call that while the ongoing call is connected with the human agent;
  - based on monitoring the ongoing call connected with the human agent, determine when an automated agent instead of the human agent is connected with the ongoing call; and
  - in response to determining that the automated agent instead of the human agent is connected with the ongoing call, send a first message to the provider network,
    - wherein the first message comprises first data indicative that the automated agent instead of the human agent is connected with the ongoing call.

12. The system of claim 11, wherein executing the executable instructions by the processor causes the processor to:
detect when the ongoing call is transferred from the human agent of the contact center to the automated agent.

13. The system of claim 11, wherein the ongoing call comprises a session initiation protocol (SIP) based call.

14. The system of claim 11, wherein the automated agent comprises an interactive voice response (IVR) system.

15. The system of claim 11, wherein the provider network comprises an ISDN network.

16. The system of claim 15, comprising:
an ISDN gateway connected to the provider network; and
wherein executing the executable instructions by the processor causes the processor to send the first message as a SIP-based message to the ISDN gateway.

17. The system of claim 11, wherein executing the executable instructions by the processor causes the processor to:
- determine when the ongoing call connected with the human agent is placed on hold; and
- in response to determining the ongoing call connected with the human agent is placed on hold, send a second message to the provider network,
  - wherein the second message comprises data indicative of the ongoing call being placed on hold.

18. The system of claim 17, wherein executing the executable instructions by the processor causes the processor to:
- subsequent to the ongoing call being placed on hold, determine when the human agent takes the ongoing call off hold; and
- in response to the ongoing call being taken off hold, send a third message to the provider network,
  - wherein the third message comprises data indicative that the human agent is connected with the ongoing call.

19. The system of claim 11, wherein executing the executable instructions by the processor causes the processor to:
- subsequent to determining that the automated agent instead of the human agent is connected with the ongoing call, reconnect the human agent to the ongoing call; and
- in response to reconnecting the human agent to the ongoing call, send a second message to the provider network,
  - wherein the second message comprises first data indicative that the human agent is reconnected to the ongoing call.

20. The system of claim 19, wherein the second message comprises second data indicative of a billing rate associated with the human agent.

* * * * *